United States Patent
Alabbasi et al.

(10) Patent No.: US 12,481,892 B2
(45) Date of Patent: Nov. 25, 2025

(54) DYNAMIC LABELING FOR MACHINE LEARNING MODELS FOR USE IN DYNAMIC RADIO ENVIRONMENTS OF A COMMUNICATIONS NETWORK

(71) Applicant: Telefonaktiebolaget LM Ericsson (PUBL), Stockholm (SE)

(72) Inventors: Abdulrahman Alabbasi, Kista (SE); Heunchul Lee, Täby (SE); Alexandros Palaios, Moers (DE); Henrik Rydén, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 546 days.

(21) Appl. No.: 17/999,162

(22) PCT Filed: May 25, 2020

(86) PCT No.: PCT/EP2020/064464
§ 371 (c)(1),
(2) Date: Nov. 17, 2022

(87) PCT Pub. No.: WO2021/239212
PCT Pub. Date: Dec. 2, 2021

(65) Prior Publication Data
US 2023/0196111 A1   Jun. 22, 2023

(51) Int. Cl.
*G06N 3/084* (2023.01)
*H04W 16/18* (2009.01)
*H04W 24/02* (2009.01)

(52) U.S. Cl.
CPC ............ *G06N 3/084* (2013.01); *H04W 16/18* (2013.01); *H04W 24/02* (2013.01)

(58) Field of Classification Search
CPC ....... G06N 3/084; G06N 3/045; H04W 16/18; H04W 24/02
(Continued)

(56) References Cited

U.S. PATENT DOCUMENTS 9,985,984 B1    5/2018  Chavez et al.
10,902,352 B2 *  1/2021  Ghosh ..................... G06F 16/35
(Continued)

OTHER PUBLICATIONS

Tianshi Wang et al., Applied Intelligence (2020) 50:2339-2351; Springer Science+Business Media, LLC, part of Springer Nature "A multi-label text classification method via dynamic semantic representation model and deep neural network"—Mar. 5, 2020.
(Continued)

*Primary Examiner* — Juan A Torres
(74) *Attorney, Agent, or Firm* — Baker Botts L.L.P.

(57) ABSTRACT

Methods and nodes in a communications network for using a machine learning model that has been trained using training data from a first radio environment, in a second radio environment, wherein the machine learning model takes a first set of features as input and outputs a label based on a first labelling scheme, the first labelling scheme having been determined for the first radio environment. A method comprises obtaining (402) a dataset in the second radio environment comprising a plurality of data points comprising values of the first set of features, labelling (404) each data point in the dataset using the first labelling scheme, and determining (406) from the labelled dataset whether the first labelling scheme is suitable for use in the second radio environment. Responsive to determining that the first labelling scheme is unsuitable for use in the second radio environment, the method further comprises determining (408) a second labelling scheme for the machine learning model, using an unsupervised labelling method.

17 Claims, 4 Drawing Sheets

(58) Field of Classification Search
USPC .................................................... 455/414.1
See application file for complete search history.

(56) References Cited

U.S. PATENT DOCUMENTS

| | | | | |
|---|---|---|---|---|
| 11,893,774 | B2* | 2/2024 | Cooper | G06V 20/00 |
| 2019/0064752 | A1 | 2/2019 | Marwah et al. | |
| 2019/0287030 | A1* | 9/2019 | Varughese | G06N 20/00 |
| 2020/0143279 | A1 | 5/2020 | West et al. | |
| 2022/0300824 | A1* | 9/2022 | Shahid | H04W 48/16 |
| 2023/0394371 | A1* | 12/2023 | Wick | G06N 20/00 |

OTHER PUBLICATIONS

Germain Forestier and Cedric Wemmert, HAL open science "Semi-supervised learning using multiple clusterings with limited labeled data", Information Sciences, Elsevier, 2016, 361-362, pp. 48-65—2016.

Yuliang Liu et al., School of Electronic and Information Engineering, South China University of Technology, Guangzhou, China, Contents lists available at Science Direct, Pattern Recognition Letters, "Automatic labeling of large amounts of handwritten characters with gate-guided dynamic deep learning"—Oct. 3, 2017.

PCT International Search Report issued for International application No. PCT/EP2020/064464—Feb. 2, 2021.

International Telecommunication Union, Telecommunication Standardization Sector, Study Period 2017-2020, SG13-TD224/PLEN, Study Group 13, English only; Source: Editors; Title: Draft new Supplement 55 to ITU-T Y.3170-series (former ITU-T Y.ML-IMT2020-Use-Cases): "Machine learning in future networks including IMT-2020: use cases"—for approval; Geneva—Oct. 14-25, 2019.

PCT Written Opinion of the International Searching Authority issued for International application No. PCT/EP2020/064464—Feb. 2, 2021.

* cited by examiner

DYNAMIC LABELING FOR MACHINE LEARNING MODELS FOR USE IN DYNAMIC RADIO ENVIRONMENTS OF A COMMUNICATIONS NETWORK

PRIORITY

This nonprovisional application is a U.S. National Stage Filing under 35 U.S.C. § 371 of International Patent Application Serial No. PCT/EP2020/064464 filed May 25, 2020 and entitled "Dynamic Labeling For Machine Learning Models for Use in Dynamic Radio Environments of a Communications Network" which is hereby incorporated by reference in its entirety.

TECHNICAL FIELD

This disclosure relates to methods, nodes and systems in a communications network. More particularly but non-exclusively, the disclosure relates to using a machine learning model that has been trained using training data from a first radio environment, in a second radio environment.

BACKGROUND

Machine learning can be used to find a predictive function for a given dataset; the dataset is typically a mapping between a given input to an output. Inputs are described as input features. Outputs may be labelled according to a labelling scheme or criteria. The predictive function (or mapping function) may be generated in a training phase, which involves providing example inputs and ground truth (e.g. correct) output labels to the model. A test phase comprises predicting the output for a given input. Applications of machine learning include, for example, curve fitting, facial recognition and spam filtering.

In the context of a communications network, machine learning models (e.g. models trained using a machine learning process) may be used in tasks including, for example resource scheduling. One challenge in the use of machine learning models is that a machine learning model trained in a first radio environment (e.g. using training data obtained in the first radio environment) may not be suitable for use in a second radio environment. Embodiments herein aim to improve on such situations.

SUMMARY

As briefly noted above, one challenge with the use of predictive models such as machine learning models in a communications network is that models are generally only optimised for use in the particular radio environment in which they were trained. However, radio environments in a communications networks may vary geographically and also may vary over time.

When training a machine learning model, training data comprising example inputs and corresponding ground truth outputs (e.g. the desired "correct" output) are provided to the machine learning model. The ground truth for each example input training data is determined using a labelling scheme, or classification scheme comprising criteria by which the data is to be labelled. Appropriate labelling schemes may be determined from the data. For example, conventional labelling methods may go through the following steps:

Collect data through various measurement reports in radio environments

Process dataset to build clustering of data, e.g., to create clusters of regions or clusters of UEs' performance or SINR, or clusters of cell edge and not cell-edge UEs Produce features (e.g. determine the inputs to the model) based on the data clustering Obtain labeling using the features to generate new labeled data, e.g., decide on mapping between UEs/geo-location and different clusters or groups.

Such labeling processes typically focus on describing the expected characteristics of features. For example, they may include equally separated labels for normal distributions, for example, with labels of: "very good", "good", "low", "very low". Equally separated labels may not be good for skewed distributions however and may lead, for example, to a significant proportion of input values being given the same label. As such labels determined from a normal distribution may not be discriminating enough on a different distribution type. A change in the distribution of feature values may thus result in a previous labelling scheme being inappropriate for a new dataset.

This is illustrated in FIG. 2 which illustrates an example of the potential limitations of conventional labeling methods that apply the same rules for labeling different data sets with diverse characteristics. FIG. 2 depicts two different distributions. The line 202 is a more balanced distribution where all the different classes (Below Noise, Low, Average, Good and Very good) are well represented and are thus likely to comprise enough samples with which to train a machine learning model. Line 204 depicts a rather different distribution, having the biggest portion of the data between the classes of low and average. The classes Below Noise and Very Good are almost empty and a machine learning algorithm may have difficulty learning from such an imbalanced data set.

Generally Radio environments are very diverse and heterogeneous. This means that it is difficult to have one labeling appropriate for all different environments. At the same time, since a radio environment evolves over time, one static labeling might be not accurate over the dynamic environment. Traffic is also heterogeneous, and its characteristic can drastically change over time. Thus a labeling obtained for a first radio environment 1 (RV1) may not work in a second radio environment (RV2). What if the system environment changed from t1 to t2, then the clustering (or labeling) created at time t1 may not suit for the new environment at t2, this is illustrated in FIG. 1 whereby a radio base station 102 serving a plurality of devices 104 (depicted as cars in this example) has coverage areas of low signal quality 106a and high signal quality 108a at a time t1. At time t2, due to the presence of new buildings 110, the coverage areas change and now the region 106b now has low signal quality and the area 108b has high signal quality. A machine learning model trained at t1 to predict signal strength based on location, for the cars 104, would become inaccurate at t2. This is an example of non-uniform zones due to a dynamic event (e.g. new buildings or an event at the stadium) that may happen over a relatively long time period, e.g. hours or months.

In a second example, elevation of drones 118 may change signal strength from the zones 112a and 114a at t1 to the zones 112b and 114b at t2. Additionally a new zone may be created 116 (e.g. with particularly good or particularly poor coverage). If drones cause these changes, then they may occur within seconds.

If the changes occur on a timescale of days or months, then system parameters can be manually reconfigured. If the difference between times is in seconds, then manual reconfiguration of system parameters is not sufficient to capture the dynamic features in the environment. Typical labeling algorithms need large data to build an accurate clustering. However, storing all the data is expensive and time consuming. Embodiments herein aim to improve on these issues, and others.

According to a first embodiment there is a method in a node of a communications network of using a machine learning model that has been trained using training data from a first radio environment, in a second radio environment. The machine learning model takes a first set of features as input and outputs a label based on a first labelling scheme, the first labelling scheme having been determined for the first radio environment. The method comprises: obtaining a dataset in the second radio environment comprising a plurality of data points comprising values of the first set of features; labelling each data point in the dataset using the first labelling scheme; determining from the labelled dataset whether the first labelling scheme is suitable for use in the second radio environment; and responsive to determining that the first labelling scheme is unsuitable for use in the second radio environment, determining a second labelling scheme for the machine learning model, using an unsupervised labelling method.

In this way, a machine learning model that has output label optimised for a first radio environment may be optimised for use in a second (e.g. new or different) radio environment. This has real-world consequences as the proposed labeling method allows dynamic redefinition of labels in a way that the resulting labeling protects performance of ML models that run over very dynamic environments. In other words, predictions made by the resulting machine learning model may be better tuned to the particular environment in which it is to be used. Thus, the machine learning model may make better, e.g. scheduling, resource orchestration decisions etc (depending on the type of machine learning model), leading to a more efficient network. Furthermore, this disclosure allows a machine learning model to be updated in an automated manner, facilitating the use of an old machine learning model in a new environment without network designers having to manually update and re-train the model. Embodiments herein further allow for the detection of invisible features in classification (or labelling) related problems, such as event-based or temporarily based mobile BSs deployments.

According to a second aspect there is a node in communications network, for using a machine learning model that has been trained using training data from a first radio environment, in a second radio environment, wherein the machine learning model takes a first set of features as input and outputs a label based on a first labelling scheme, the first labelling scheme having been determined for the first radio environment. The node comprises a memory comprising instruction data representing a set of instructions, and a processor configured to communicate with the memory and to execute the set of instructions. The set of instructions, when executed by the processor, cause the processor to: obtain a dataset in the second radio environment comprising a plurality of data points comprising values of the first set of features; label each data point in the dataset using the first labelling scheme; determine from the labelled dataset whether the first labelling scheme is suitable for use in the second radio environment. Responsive to determining that the first labelling scheme is unsuitable for use in the second radio environment, the set of instructions further cause the processor to determine a second labelling scheme for the machine learning model, using an unsupervised labelling method.

According to a third aspect there is a computer program product comprising a computer readable medium, the computer readable medium having computer readable code embodied therein, the computer readable code being configured such that, on execution by a suitable computer or processor, the computer or processor is caused to perform the method of the first aspect.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION

Embodiments herein propose dynamic labeling schemes for machine learning (ML) models for use in dynamic radio applications. Embodiments herein may adaptively create new labeling by leveraging intelligent labeling system along with a combination of a static labeling scheme and new data. The proposed labeling method allows dynamic redefinition of labels in a way that the resulting labeling protects performance of ML models that run over very dynamic environments, for instance when deploying mobile BSs in an event-based deployment.

Generally, the communications network (or telecommunications network) may comprise any one, or any combination of: a wired link (e.g. ASDL) or a wireless link such as Global System for Mobile Communications (GSM), Wideband Code Division Multiple Access (WCDMA), Long Term Evolution (LTE), WiFi, or Bluetooth wireless technologies. The wireless network may comprise and/or interface with any type of communication, telecommunication, data, cellular, and/or radio network or other similar type of system. A wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards. The skilled person will appreciate that these are merely examples and that the communications network may comprise other types of links.

Figure 3:
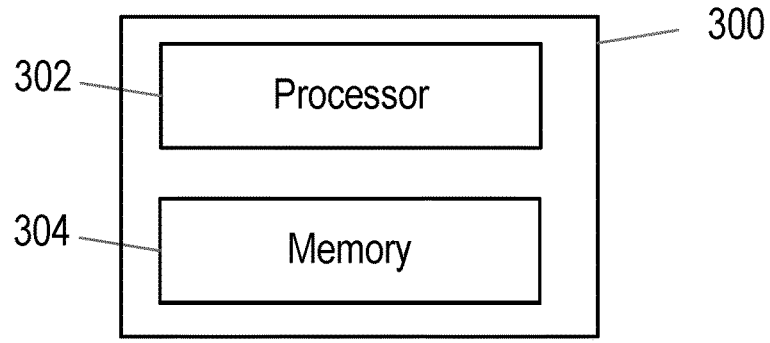
FIG. 3 illustrates an example node according to some embodiments herein.

FIG. 3 illustrates a network node 300 in a communications network according to some embodiments herein. The node 300 is configured (e.g. adapted or programmed) to perform any of the embodiments of the method 400 as described below.

Generally, the node 300 may comprise any component or network function (e.g. any hardware or software module) in the communications network suitable for performing the functions described herein.

For example, in some embodiments, the node 300 may comprise a node comprising equipment capable, configured, arranged and/or operable to communicate directly or indirectly with a UE (such as a wireless device) and/or with other network nodes or equipment in the communications network to enable and/or provide wireless or wired access to the UE and/or to perform other functions (e.g., administration) in the communications network. Examples of nodes include, but are not limited to, access points (APs) (e.g., radio access points), base stations (BSs) (e.g., radio base stations, Node Bs, evolved Node Bs (eNBs) and NR NodeBs (gNBs)). Further examples of nodes include but are not limited to core network functions such as, for example, core network functions in a Fifth Generation Core network (5GC).

In other embodiments, the node 300 may comprise a wireless device capable, configured, arranged and/or operable to communicate wirelessly with network nodes and/or other wireless devices. Unless otherwise noted, the term UE may be used interchangeably herein with wireless device (WD). Communicating wirelessly may involve transmitting and/or receiving wireless signals using electromagnetic waves, radio waves, infrared waves, and/or other types of signals suitable for conveying information through air. In some embodiments, a UE may be configured to transmit and/or receive information without direct human interaction. For instance, a UE may be designed to transmit information to a network on a predetermined schedule, when triggered by an internal or external event, or in response to requests from the network. Examples of a UE include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A UE may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as an MTC device. As one particular example, the UE may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

The node 300 may be configured or operative to perform the methods and functions described herein, such as the methods 400 as described below. The node 300 may comprise a processor (e.g. processing circuitry or logic) 302. It will be appreciated that the node 300 may comprise one or more virtual machines running different software and/or processes. The node 300 may therefore comprise one or more servers, switches and/or storage devices and/or may comprise cloud computing infrastructure or infrastructure configured to perform in a distributed manner, that runs the software and/or processes.

The processor 302 may control the operation of the node 300 in the manner described herein. The processor 302 can comprise one or more processors, processing units, multi-core processors or modules that are configured or programmed to control the node 300 in the manner described herein. In particular implementations, the processor 302 can comprise a plurality of software and/or hardware modules that are each configured to perform, or are for performing, individual or multiple steps of the functionality of the node 300 as described herein.

The node 300 may comprise a memory 304. In some embodiments, the memory 304 of the node 300 can be configured to store program code or instructions that can be executed by the processor 302 of the node 300 to perform the functionality described herein. Alternatively or in addition, the memory 304 of the node 300, can be configured to store any requests, resources, information, data, signals, or similar that are described herein. The processor 302 of the node 300 may be configured to control the memory 304 of the node 300 to store any requests, resources, information, data, signals, or similar that are described herein.

It will be appreciated that the node 300 may comprise other components in addition or alternatively to those indicated in FIG. 3. For example, in some embodiments, the node 300 may comprise a communications interface. The communications interface may be for use in communicating with other nodes in the communications network, (e.g. such as other physical or virtual nodes). For example, the communications interface may be configured to transmit to and/or receive from other nodes or network functions requests, resources, information, data, signals, or similar. The processor 302 of node 300 may be configured to control such a communications interface to transmit to and/or receive from other nodes or network functions requests, resources, information, data, signals, or similar.

The node is configured for using a machine learning model that has been trained using training data from a first radio environment, in a second radio environment, wherein the machine learning model takes a first set of features as input and outputs a label based on a first labelling scheme, the first labelling scheme having been determined for the first radio environment.

Briefly, in one embodiment, the node 300 may be configured to i) obtain a dataset in the second radio environment comprising a plurality of data points comprising values of the first set of features; ii) label each data point in the dataset using the first labelling scheme; iii) determine from the labelled dataset whether the first labelling scheme is suitable for use in the second radio environment; iv) responsive to determining that the first labelling scheme is unsuitable for use in the second radio environment, determine a second labelling scheme for the machine learning model, using an unsupervised labelling method.

Figure 4:
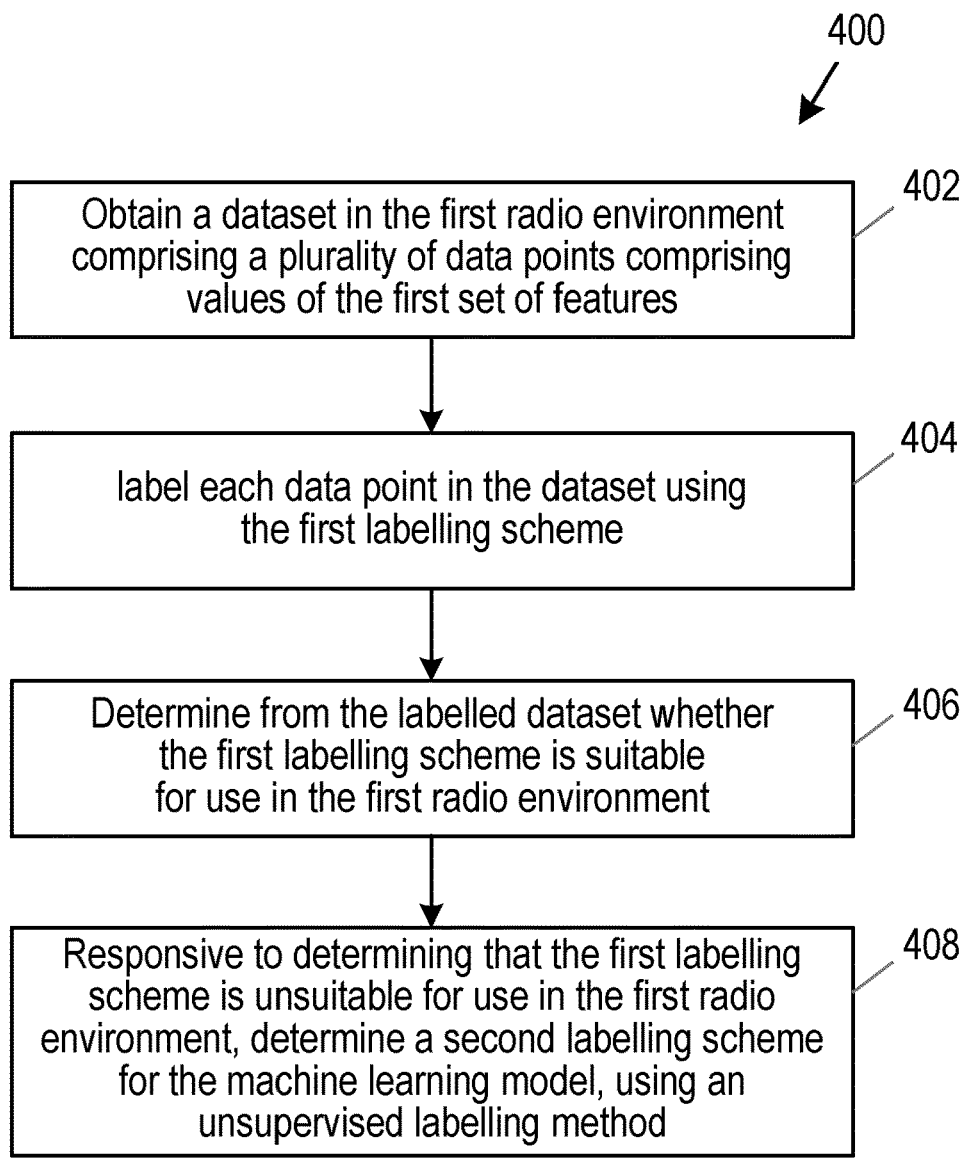
FIG. 4 illustrates an example method according to some embodiment herein.

FIG. 4 illustrates a computer implemented method 400 according to some embodiments herein. The method 400 comprises a method of using a machine learning model that has been trained using training data from a first radio environment, in a second radio environment, wherein the machine learning model takes a first set of features as input and outputs a label based on a first labelling scheme, the first labelling scheme having been determined for the first radio environment. In a first step, the method comprises obtaining 402 a dataset in the second radio environment comprising a plurality of data points comprising values of the first set of features. In a second step the method comprises labelling 404 each data point in the dataset using the first labelling scheme. In a third step the method comprises determining 406 from the labelled dataset whether the first labelling scheme is suitable for use in the second radio environment. In a fourth step the method comprises, responsive to determining that the first labelling scheme is unsuitable for use in the second radio environment, determining 408 a second labelling scheme for the machine learning model, using an unsupervised labelling method.

The method 400 may be performed by the node 300. In some embodiments, each step of the method 400 may be performed, for example, by a (processing) module of the node 300 described above.

In more detail, the term machine learning model is used herein to denote any model that has been trained using a machine learning process. The skilled person will be familiar with machine learning. Machine learning can be used to find a predictive function for a given dataset; the dataset is typically a mapping between a given input to an output. The predictive function (or mapping function) is generated in a training phase, where the training phase assumes knowledge of both the input and output. The test phase comprises predicting the output for a given (previously unseen) input. Applications of machine learning include, for example, curve fitting, facial recognition and spam filtering.

In embodiments herein, the model may comprise any type of machine learning model that is trained to take a plurality of input values and make a prediction in a communications network. In some embodiments the model may comprise a supervised learning model, such as, for example, a (deep) neural network, random forest, decision tree, or any other type of supervised machine learning model.

The machine learning model has been trained using training data from a first radio environment. A radio environment in this context relates to e.g. a particular set of radio conditions (including, for example, network coverage, signal quality etc) resulting from the prevailing network configuration (e.g. configuration of network nodes), and/or natural or urban geography.

The machine learning model takes a first set of features as input and outputs a label based on a first labelling scheme, the first labelling scheme having been determined for the first radio environment. The first set of features may also have been determined for the first radio environment.

A label may generally comprise the output for a particular combination of input features. In other words a label may comprise a classification or prediction. A labelling scheme in this context comprises the criteria used to label values of the input features of the machine learning model with a particular output label. E.g. the criteria used to label the training data used to train the machine learning model.

Methods and nodes herein relate to use of a machine learning model trained in a first radio environment, in a second radio environment.

In some examples, the second radio environment may comprise the same geographic location as the first radio environment, but at a later point of time. In other words, the second radio environment may comprise an evolution of the first radio environment (e.g. from a time t1 to a time t2).

Thus the first and/or second radio environment may comprise a dynamic or time-varying radio environment. For example, the geographical location corresponding to the second radio environment may be undergoing physical changes due to new buildings or movement of traffic or similar. Generally the nodes and methods herein can be applied to any scenario in a communications network where a machine learning model is used that requires online classification with dynamic labeling. E.g. the nodes and methods herein can be applied to any scenario in a communications network where a machine learning model is used in a dynamic or time-varying environment. For example, the machine learning model may comprise any machine learning model that needs to collect data from time-varying fields, for exampling collecting RSRP measurement to predict future RSRP measurements Alternatively, the second radio environment may comprise a different geographical location. For example, the method may relate to a new deployment of an old machine learning model. For example, the first environment may comprise a standard or typical radio environment (E.g. the machine learning model may be "out of the box"). The second radio environment may thus be a new radio environment in which a standard or old machine learning model is to be deployed.

Examples include, but are not limited to a machine learning model used to predict an optimal configuration of a plurality of mobile base-stations (e.g. aerial drones) in order to provide radio coverage of a particular area. For example, temporary radio coverage for an event. In such an embodiment, an overall ML framework may be deployed (which can be either centralized or distributed) that takes input from the flying/mobile base-station and commands the mobile base stations about the right location, based on e.g., a classification problem with dynamic labeling. This is discussed further with respect to FIG. 5 below. In embodiments where the machine learning model is used to predict a configuration of mobile drones in order to provide radio coverage, this means that network designers are not needed to manually (and possibly inefficiently) set up the network (mobile/drone BSs) in event-based deployment, such as stadium or social/professional based unexpected or temporary events.

In another embodiment, the machine learning model may comprise a model used to determine mobile/drone base-station characteristics in events that have heterogeneous and dynamic traffic and load. For example, the machine learning model may output: Cell radius, Beams, Frequency reusing among drone cells and/or a Drone position.

More generally, the machine learning model may be trained, for example, to make resource allocation or scheduling decisions in a communications network.

In some embodiments the first labelling scheme may thus be thought of as an "old" or historical labelling scheme. For example, the systems and methods herein may be used when a labelling scheme might be out of date, or need updating.

In some embodiments herein the first labelling scheme may be a static labelling scheme. For example, it may have been determined manually by a user as part of the training of the machine learning model in the first radio environment.

In block 402 the method comprises obtaining a dataset in the second radio environment comprising a plurality of data points comprising values of the first set of features. In other words a training data set is obtained in the second radio environment comprising a plurality of example sets of values corresponding to the input parameters of the machine learning model.

The dataset may be obtained from interactions between other nodes in the second radio environment. For example, gNBs (or distributed gNB-DU) have several interactions, that include transmissions and receptions. Many of these interactions can potentially be inputs to the machine learning model. The dataset may thus comprise any combination of parameters or features obtained from such interactions, including but not limited to:

Reception of Learning Related Information:
    UE measurements and report on CSI, and measured RSRP and RSRQ of the target and neighbor cells.
    UE estimated SINR.
    Neighbour cells signal strength.
    UE or packet end-to-end latency.

Transmission of Learning Related Information:
    Of reference signals to UEs in the current cell and neighbor cells.

Measured Information Related to Learning:
    UEs aggregated throughput, and cell throughput
    Environments:
    Temperature,
    Input for event handler, e.g., Number of customers that are participating in the event, and potential distribution.

These parameters (and others) may be iteratively transmitted by a plurality of e.g. gNBs to the node performing the method 400.

In block 404 the method comprises labelling each data point in the dataset using the first labelling scheme. In other words each example sets of input values is classified using the first labelling scheme, which as above may be considered as the e.g. old, out of date or static labelling scheme.

In block 406 the method comprises determining from the labelled dataset whether the first labelling scheme is suitable for use in the second radio environment. For example, by determining whether there are missing labels (or missing label configuration in the first labelling scheme).

For example, block 406 may comprise performing clustering on the data points in the labelled dataset to determine one or more clusters. The step of determining from the labelled dataset whether the first labelling scheme is suitable for use in the second radio environment, may then be based on the one or more clusters.

For example, this can be determined by checking the sum of squared distance (SSD) versus the number of clusters. If the decrease in the SSD of cluster $c\_\{n+1\}$ compared to cluster $c\_\{n\}$ is greater than a predetermined threshold, then it may be determined that the first labelling scheme is unsuitable for use in the second radio environment. For example, the clustering number (e.g. the number of labels) should increase by at least one.

In another example, principal component analysis (PCA) may be used as a way to increase the dimensionality of the labels. For example, the clustering results may be tested with new PCA labels. If the information loss of the new label scheme improves (e.g. reduces) then the first labelling scheme may be unsuitable for use in the second radio environment.

In another example, the method may comprise determining that the first labelling scheme is suitable for use in the second radio environment if the clusters coincide (e.g. to within a predefined degree, or percentage) with the labels of the first labelling scheme. For example, if the data points cluster according to the labels in the first labelling scheme.

Figure 1:
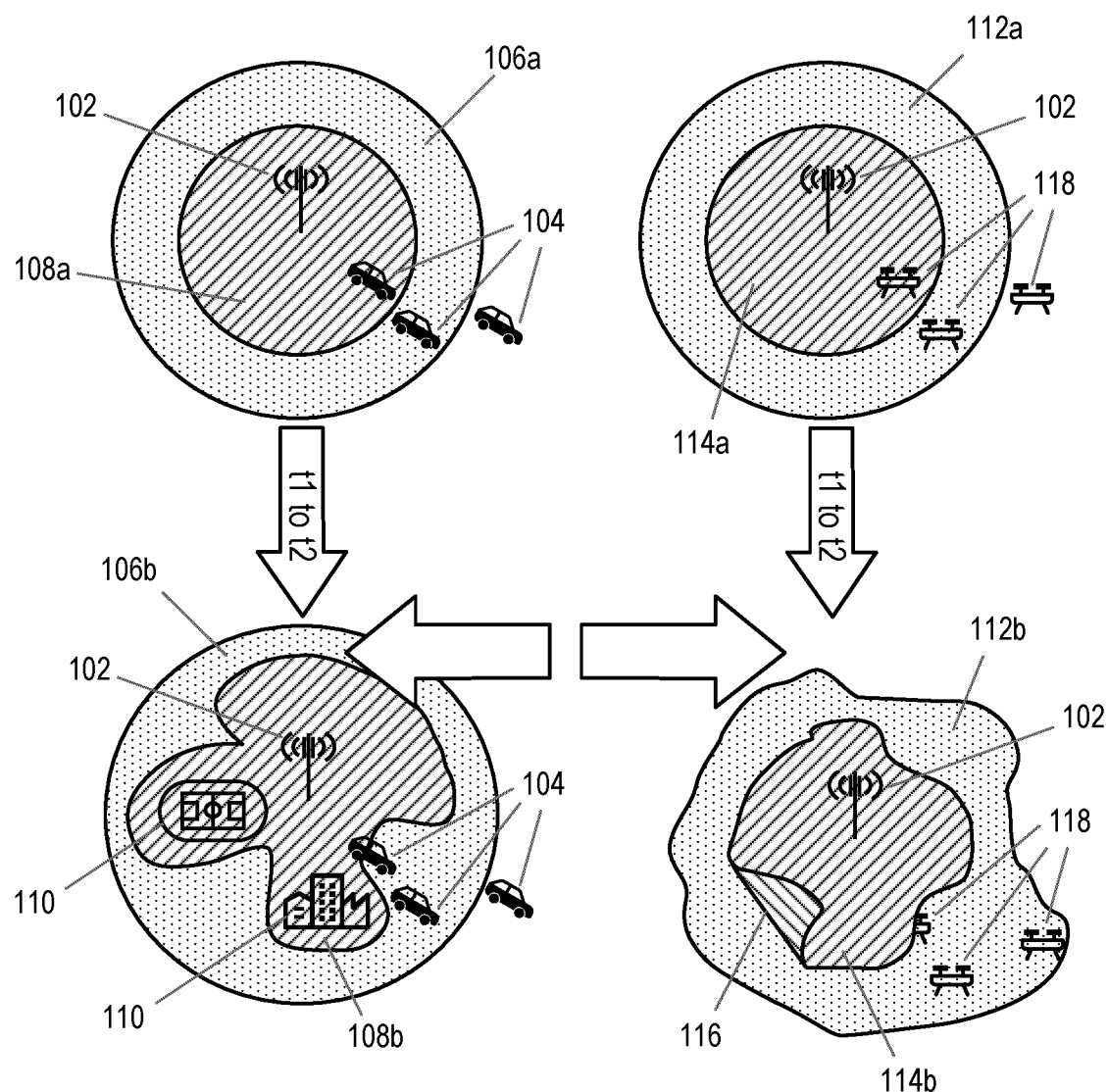
FIG. 1 illustrates an example situation where the coverage area of a radio base station may change over two different time scales.
Figure 2:
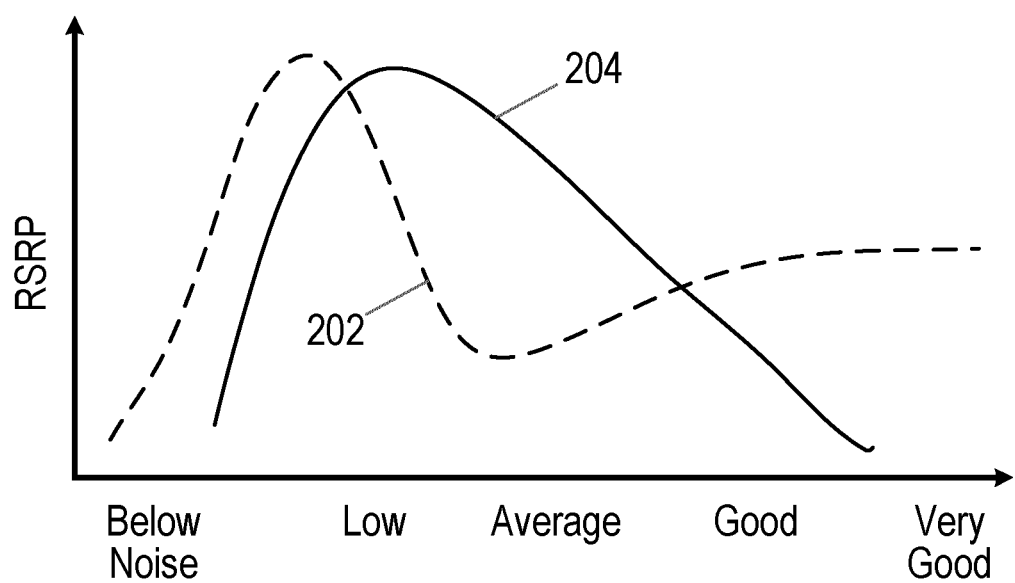
FIG. 2 illustrates how training examples may be distributed between different labels of a labelling scheme for two different distributions.

As described above with respect to FIG. 2, generally it is desirable for data points in a dataset to be evenly distributed between different labels in a labelling scheme. Therefore, in some embodiments, the step of determining 406 from the labelled dataset whether the first labelling scheme is suitable for use in the second radio environment is based on a distribution of the labels of the data points in the labelled dataset. For example, in some embodiments, the method may comprise determining that the first labelling scheme is suitable for use in the second radio environment if the data points are (relatively) evenly distributed between each label in the first labelling scheme.

Conversely, the method may comprise determining that the first labelling scheme is unsuitable for use in the second radio environment if the data points are (relatively) unevenly distributed between each label in the first labelling scheme. For example, a class (or cluster) distribution skew may be determined. If the skew is close to (e.g. within a predetermined tolerance level from) the mean, then the datapoints may be determined to be sufficiently evenly distributed between each label in the first labelling scheme. If the skew is not close to (e.g. more than a predetermined tolerance level from) the mean then the data may be determined to be unevenly distributed.

In some embodiments, the student t-test may be performed on the data labelled according to the first labelling scheme, if the test results in $p<0.05$ (p being the output of student t-test) then the original distribution may be determined to be evenly distributed, otherwise it may be determined to be unevenly distributed between the data labels in the first labelling scheme.

Block 408 then comprises, responsive to determining that the first labelling scheme is unsuitable for use in the second radio environment, determining a second labelling scheme for the machine learning model, using an unsupervised labelling method. The second labelling scheme may be thought of as a "new" or "updated" labelling scheme.

In some embodiments, for example, the unsupervised labelling method may comprise dynamic post-labelling. Related references in the literature include the paper by Wang et al. entitled *"A multi-label text classification method via dynamic semantic representation model and deep neural network"; Appl Intell* (2020). Also, the paper by Liu et al. 2017 entitled "Automatic labeling of large amounts of handwritten characters with gate-guided dynamic deep learning".

In some embodiments, the step of determining 408 a second labelling scheme for the machine learning model, using an unsupervised labelling method may comprise partitioning a first label from the first labelling scheme into two or more new labels in the second labelling scheme if two or more corresponding sub-clusters are determined in a cluster of the data points in the labelled dataset corresponding to the first label.

Conversely, using an unsupervised labelling method may comprise combining two or more labels from the first labelling scheme into a single new label in the second labelling scheme if data points in the labelled dataset corresponding to the two or more labels (combine to) form a single cluster.

In some embodiments, the step of determining 408 a second labelling scheme for the machine learning model, using an unsupervised labelling method may comprise changing a labelling criteria for one or more labels in the first labelling scheme so as to redistribute the data points in the labelled dataset more equally between different labels in the second labelling scheme, compared to the first labelling scheme. For example, an unsupervised labelling agent may change a multi-label threshold or region, while keeping the same multiple label. Alternatively, the agent might change the number of labels, by increasing or decreasing it, to a number suitable for the dataset obtained in the second environment.

In some embodiments, step 408 may comprise adding or removing a label in the first labelling scheme so as to distribute the data points in the labelled dataset more equally between different labels in the second labelling scheme, compared to the first labelling scheme.

As noted above, in step 406, the method may comprise checking the sum of squared distance (SSD) versus the number of clusters. If the decrease in the SSD of cluster $c\_\{n+1\}$ compared to cluster $c\_\{n\}$ is greater than a predetermined threshold, then it may be determined that the first labelling scheme is unsuitable for use in the second radio environment. For example, the clustering number should increase by at least one. In such a scenario, step 408 may then comprise running a clustering process (e.g. algorithm) with n+1 and n−1 to check whether there is a need to add an additional label to the first labelling scheme (e.g. if the n+1 result is better, e.g. according to the skew or student-t tests described above) or remove a label (e.g. if the n−1 result is better).

In this way, a second e.g. new labelling scheme may be determined that is optimised for the second radio environment. After step 408, the method may then comprise performing further training on the machine learning model using the dataset, labelled according to the second labelling scheme, as training data. The skilled person will be familiar with methods for training machine learning models, such as, for example, gradient descent and back-propagation. The machine learning model may thus be trained for the second radio environment. The method 400 may be performed in an automated or semi-automated manner, which may enable a machine learning model to be efficiently updated without supervision, for a new radio environment.

As noted above, the method may be used in dynamic (e.g. time varying environments. As such, in some embodiments, the method may be repeated in order for the machine learning mode to adapt and/or maintain accuracy in response to changes in the environment.

For example, the method may be repeated by obtaining a new dataset in the second radio environment comprising a plurality of values of the first set of features; labelling the new dataset using the second labelling scheme; determining from the new labelled dataset whether the second labelling scheme is still suitable for use in the second radio environment; and responsive to determining that the second labelling scheme is no longer suitable for use in the second radio environment, determining a third labelling scheme for the machine learning model, using the unsupervised labelling method.

Generally the method 400 may be repeated periodically, in response to a detected change in the radio environment, or if the machine learning model is deployed in a new radio environment. In this way there is provided an automated manner in which to update a labelling scheme of a machine learning model in response to changes in environment.

In some embodiments, the machine learning model may further be updated with respect to its input features. In some embodiments the method 400 comprises determining from the labelled dataset whether the first set of features are suitable for use in the second radio environment. Responsive to determining that the first set of features are unsuitable for use in the first radio environment, the method 400 may then comprise determining a second set of features for the machine learning model. In other words, it may be determined whether the input features to the model are the most appropriate features for the second radio environment.

For example, determining from the labelled dataset whether the first set of features are suitable for use in the second radio environment may comprise determining that new features are available in the second radio environment that are different to the first set of features (e.g. new features that weren't available in the first environment).

In other examples, determining from the labelled dataset whether the first set of features are suitable for use in the second radio environment may comprise determining that one or more features in the first set of features are unsuitable for, or not available in, the second radio environment.

Clustering may be used to determine new input features suitable for the second radio environment. New features can be considered via different ways: 1. Distances between existing features, e.g. if the distance between two features in a clustering scheme is greater than a predefined threshold distance, then a new feature may be added between them. 2. Running for example a convolutional neural network (CNN) on the current signal, to discover signal features, such as periodicity or abnormality or some new interference which may have resulted from a different event. In this sense, the "current signal" can be any signals used in the dataset obtained in step 402 (e.g. with respect to FIG. 5 as described below, the signal may comprise the input features to the L1 and A1 algorithms) e.g., UE SINR, CSI, RSRQ, RSRP, throughput, neighbour cell signal strength, and/or latency. A CNN of 1 or 2 dimensions may help extract/identify changes in some feature of such signals, such as the periodicity or strengths, etc. CNNs are known for their ability to utilize features in an input image or signal. Tuning and changing the parameters of CNN (e.g. the size of the convolution area at each step) may provide an idea of what kind of features are in the signals.

If it is determined that the first set of features are unsuitable for use in the first radio environment, the method 400 may then comprise determining a second set of features for the machine learning model using methods such as those described in the paper entitled "*Semi-supervised learning using multiple clusterings with limited labeled data*", Forestier & Wemmert, September 2016.

Turning now to particular embodiments, in some embodiments, the machine learning model may be for use in determining a configuration of a plurality of mobile base stations in order to provide radio access to the communications network in a new (e.g. "second") radio environment. For example, mobile base-stations (e.g., drone base-stations) may fly to an event to provide a cellular coverage. The setup of such base-station should be autonomously conducted. The method 400 may thus be used for the redefinition of labels in a way that protects the performance of the ML models. The temporary deployment of mobile BSs (e.g. to support social or profession events in an inaccessible place without infrastructure), is an example of a very dynamic environment. In such embodiments, the mobile base stations may comprise drones. In step 402 the dataset in the second radio environment may comprise information from reference signals sent between the drones and a plurality of User Equipments, UEs, in the second radio environment; and/or information related to a geographical layout of a region comprising (e.g. encompassing) the second radio environment.

In this embodiment, the model may be re-trained using a second labelling scheme (determined using the method 400) suitable for the second radio environment. A configuration for the mobile drone devices may be determined using the model, e.g. as optimised for the second radio environment. The method may then comprise configuring the mobile base stations to provide the radio coverage, e.g. according to the configuration determine by the model. This is described in more detail below.

Figure 5:
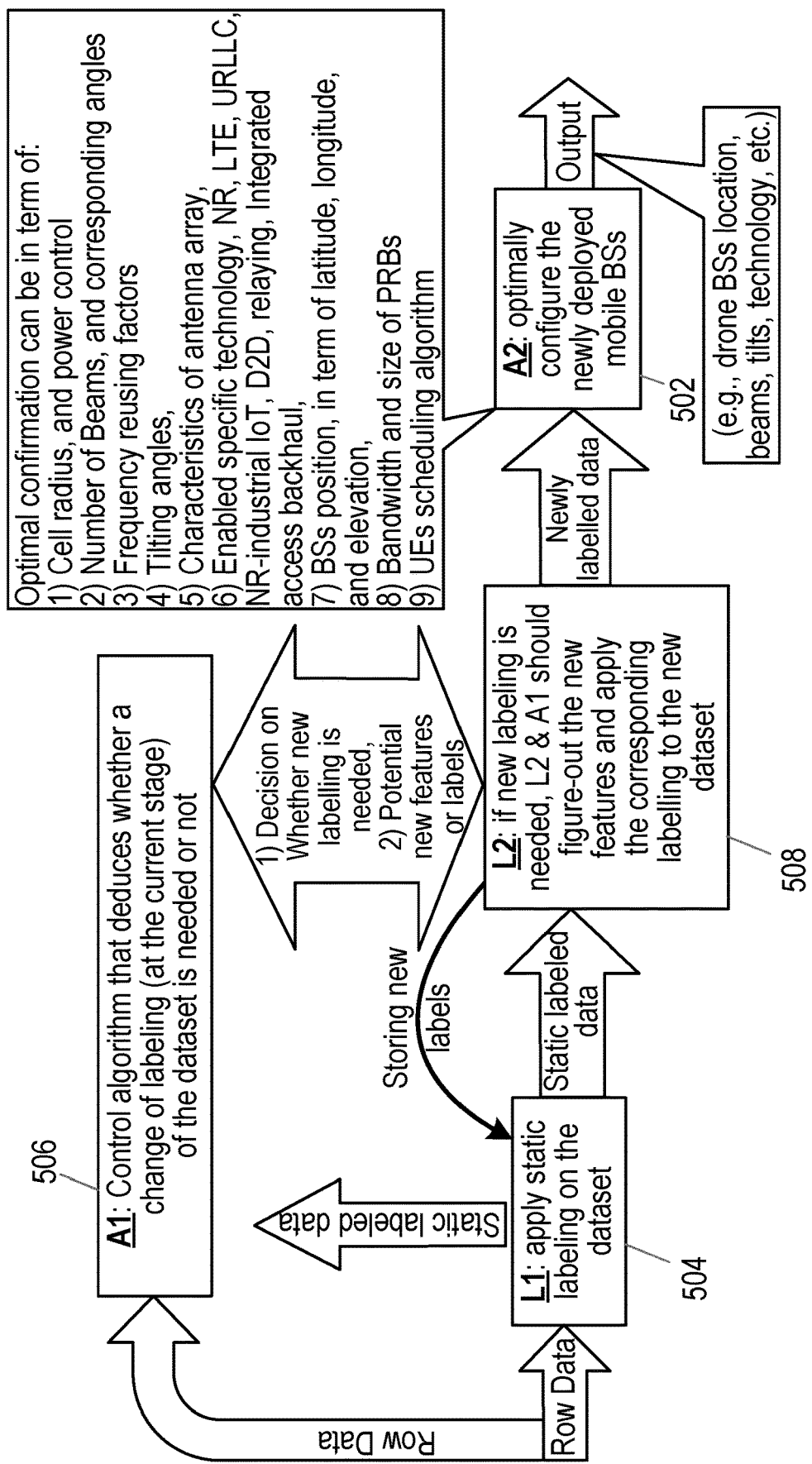
FIG. 5 illustrates an example process according to some embodiments herein.

Turning now to FIG. 5 which illustrates a system according to some embodiments herein. The system may be used to determine whether a new (e.g. "second") labelling scheme is required for a machine learning model 502 that has been trained using training data from an old or historical ("first") radio environment, in order for the machine learning model to be suitable for use in the new radio environment. The machine learning model takes a first set of features as input and outputs a label based on a first labelling scheme, the first labelling scheme having been determined for the historical radio environment.

In this embodiment, to illustrate the embodiment, it is described with respect to a machine learning model used to co-ordinate mobile base-stations (e.g., drone base-stations) that are flying to an event to provide a cellular coverage. For example, in this embodiment, the machine learning model may take input from the flying/mobile base-stations and command the mobile base stations about the right location, based on e.g., a classification problem with dynamic labelling, as explained below. In this example, the new environment comprises the new geographical area that the mobile-base stations are to be deployed in. The machine learning model 502 has been trained to predict labels based on a first labelling scheme, as described above.

In this embodiment, a system comprises the following main components (or blocks):

502: Machine Learning Model (A2): this may be a classification or regression algorithm. In the example of drones flying to provide mobile coverage, the ML model may be for e.g., to decide or predict on 1) Cell radius, and best power control algorithm 2) Number of Beams, and corresponding angles and beam widths. 3) Frequency reusing factors among drone cells. 4) Mechanical and electrical Tilting angles, 5) Characteristics of antenna array, size and number of antenna elements, 6) Enabled specific technology features such as, NR, LTE, URLLC, NR-industrial IoT, D2D, relaying, Integrated access backhaul, 7) BSs position, in term of latitude, longitude, and elevation, Bandwidth and size of PRBs, 8) UEs scheduling algorithm. It will be appreciated that this is an example for illustrative purposes however, and that the machine learning model 502 may comprise any machine learning model used in a communications network.

504: Static Labelling (L1): this module takes a dataset obtained in the new environment as input ("Row Data") and labels each data point in the dataset using the first (e.g. old or historical) labelling scheme (e.g. block 504 may perform steps 404 and/or 406 of the method 400). The first labelling scheme may comprise, for example, labels determined using a conventional labelling method, e.g., "static labelling" system. This can be for example the use of labels that create equal distribution of the labels, between the classes (uniform distribution).

506: A Control Algorithm (A1): this block determines from the labelled dataset whether the old labelling scheme is suitable for use in the new radio environment (e.g. it performs step 406 of method 400 as described above). In other words, this block is to deduce whether a change of labelling of the (current) classification problem is required or not. This may be based on whether it detects new invisible features that could not be found in the original training data that was used to train the model. As described above, this can be conducted via several methods, one of which is to run clustering algorithm on group of data entries (defined as the rows of the data, each row represents a sample point) that had similar old feature but had similar supervised output (like performance or rsrq or throughput). This clustering algorithm will inform us how to break-down these entries into several sub-groups.

508: New/Dynamic Labeling (L2): Intelligent labeling system that takes input from unlabelled data+static labeling system (L1)+decisions from control algorithm (A1). If the Control Algorithm (A1) 506 determines that the first labelling scheme is unsuitable for use in the second radio environment, then this block determines a second (e.g. new) labelling scheme for the machine learning model, using an unsupervised labelling method (e.g. block 506 performs step 408 of the method above). This block may use an intelligent unsupervised agent to determine new features and label the data accordingly (e.g. produce new/dynamic labelled data).

As noted above, this configuration may be used for any machine learning model. However, for the example where the machine learning model is used to determine a configuration of mobile drones in order to provide radio coverage to a geographical area that otherwise has limited mobile coverage (e.g. for an event), an operation procedure for ongoing operation of the system is illustrated in FIG. 5 can be described as follows:

1. A data set "dataset1" is obtained from the BS drones. The learning agent (A1 and L1) will identify the Labels from the provided dataset1 (by BSs drones) using unsupervised learning on the static labelled data according to method 400 as described above.
   After finishing such a process, the machine learning model A2 may be trained on the dataset (using the new labels). The learning agents may then delete dataset1 for memory savings.
2. The BSs drones may then keep feeding data to the overall learning framework to Detect new "invisible features" (by A1)
   Invisible features: are the features that could not be set or found in the old setting of the model or original collected data. This can be due to:
   a. not knowing about such important feature, or
   b. lack of features in the original dataset.
   This newly collected data is obtained from UE and mobile BSs measurement to a centralized learning agent, e.g node 300.
3. Such a centralized learning agent may label the data using unsupervised learning (including "invisible features", this process will be conducted via L2&A1).

4. Then the overall learning agent may combine the input from A1 (dynamic labelling) and L1 (static labelling), and feed them to A2.
5. The method may then be iterated over the above process with every newly collected data arriving at the input to the overall system.

In this way, the method 400 can be used to iteratively update a machine learning model, ensuring that the labelling scheme and input parameters remain optimised in a dynamic environment. Adopting such methods may have an early and optimal impact on the mobile/drone BSs settings & characteristics, which enhance traffic scheduling and load balancing issues. Therefore, the method may enhance system capacity (in term of number of served users) and overall throughput. Which may be beneficial in the event-based BSs deployment. Enhanced labelling may optimality increase scheduling impact of performance (throughput, and radio access latency) and reducing the overhead on the channel usage for signalling, since the above interaction is only needed during the training phase.

Possible signaling between different entities in a communications network in order to enable the method 400 is described below for the node architecture shown in FIG. 5 and the mobile drone deployment example above. In this example, signaling between a gNBs, UEs and a centralized agent (e.g. node) 300 performing the method 400 is described in the context of a 5G network. However it will be appreciated that the signaling described applies equally to other nodes in other types of communications networks. It will also be appreciated that the mobile drone example is merely an example and such signaling applies equally to other types of machine learning model. The node 300 comprises the modules A1, A2, L1, L2 as described above with respect to FIG. 5.

As noted above, a gNB (or distributed gNB-DU) has several interactions (e.g. transmission and receptions) that can be considered as inputs to the learning agent (A1,A2, L1,L2). Note: that these interactions are required during both training and testing phases, but with finer granularity during the training phase. The dataset obtained in step 402 as described above may thus be obtained/comprised from parameters including the following:
 a. Reception of Learning related information:
  i. UE measurements and report on CSI, and measured RSRP and RSRQ of the target and neighbor cells.
  ii. UE estimated SINR.
  iii. Neighbor cells signal strength.
  iv. UE or packet end-to-end latency.
 b. Transmission of learning related information:
  i. Of reference signals to UEs in the current cell and neighbor cells.
 c. Measured information related to learning:
  i. UEs aggregated throughput, and cell throughput
  ii. Environments:
   1. Temperature
   2. Input for event handler, e.g., Number of customers that are participating in the event, and potential distribution.

The information above may be iteratively transmitted to a centralized node 300 (e.g. a centralized learning agent). Note: this step may be performed at both training and implementation/testing phases.

The gNB may iteratively receive setting-up and characteristic optimal parameters from the centralized agent/node 300. Note: this step may be performed at both training and implementation/testing phases.

From the UE perspective, UEs may:
 a. Receive reference signals from gNB-DUs.
 b. Report back to gNB-DU the measured RSRP/RSRQ/SINR on difference carriers.
 c. Report back to gNB-DU the end-to-end latency.
 d. Report back potential environments impact, such as temperature, radio noise floor, etc.

Note: these steps may be performed by UEs at both training and implementation/testing phases. In some embodiments, they may be performed with finer granularity during training in compared to testing. Running with finer granularity might enhance the system response rate or ability to discover new features in the training phase.

From the perspective of the node 300 (e.g. a Centralized learning agent or gNB-CU):
 a. The node 300 may obtain/receive the dataset from the current radio environment (e.g. the "first" radio environment) comprising all the above information via interfacing with gNB-DUs.
 b. The node 300 may perform the method 400 described above and exchange such information with the framework sub-components, i.e., A1, A2, L1, and L2.
 c. The node 300 may then send back the learned output decision. for example, in an embodiment where the machine learning model (A2) is used to set-up a plurality of drone BSs, the outputs sent may comprise:
  i. Cell radius, hence maximum power, and best power control algorithm.
  ii. Number of Beams, and corresponding angles and beam widths.
  iii. Frequency reusing factors among drone cells.
  iv. Mechanical and electrical Tilting angles.
  v. Characteristics of antenna array, size and number of antenna elements.
  vi. Enabled specific technology features such as, NR, LTE, urllc, NR-industrial IoT, D2D, relaying, Integrated access backhaul.
  vii. BSs position, in term of latitude, longitude, and elevation.
  viii. Bandwidth and size of PRBs
  ix. UEs scheduling algorithm, round robin or proportional fairness, etc.

Note that as above, these steps may be required at both training and implementation/testing phases. But may be performed with finer granularity during training in compared to testing.

Turning now to another embodiment, in another embodiment, there is provided a computer program product comprising a computer readable medium, the computer readable medium having computer readable code embodied therein, the computer readable code being configured such that, on execution by a suitable computer or processor, the computer or processor is caused to perform the method or methods described herein.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method in a node of a communications network of using a machine learning model that has been trained using training data from a first radio environment, in a second radio environment, wherein the machine learning model takes a first set of features as input and outputs a label based on a first labelling scheme, the first labelling scheme having been determined for the first radio environment, the method comprising:
    obtaining a dataset in the second radio environment comprising a plurality of data points comprising values of the first set of features;
    labelling each data point in the dataset using the first labelling scheme;
    determining from the labelled dataset whether the first labelling scheme is suitable for use in the second radio environment; and
    responsive to determining that the first labelling scheme is unsuitable for use in the second radio environment, determining a second labelling scheme for the machine learning model, using an unsupervised labelling method.

2. A method as in claim 1 further comprising:
    performing clustering on the data points in the labelled dataset to determine one or more clusters; and
    wherein the step of determining from the labelled dataset whether the first labelling scheme is suitable for use in the second radio environment, is based on the one or more clusters.

3. A method as in claim 2 wherein the step of determining a second labelling scheme for the machine learning model, using an unsupervised labelling method comprises partitioning a first label from the first labelling scheme into two or more new labels in the second labelling scheme if two or more corresponding sub-clusters are determined in a cluster of the data points in the labelled dataset corresponding to the first label.

4. A method as in claim 2 wherein the step of determining a second labelling scheme for the machine learning model, using an unsupervised labelling method comprises combining two or more labels from the first labelling scheme into a single new label in the second labelling scheme if data points in the labelled dataset corresponding to the two or more labels form a single cluster.

5. A method as in claim 1 wherein the step of determining from the labelled dataset whether the first labelling scheme is suitable for use in the second radio environment is based on a distribution of the labels of the data points in the labelled dataset.

6. A method as in claim 1 wherein the step of determining a second labelling scheme for the machine learning model, using an unsupervised labelling method comprises:
    changing a labelling criteria for one or more labels in the first labelling scheme so as to redistribute the data points in the labelled dataset more equally between different labels in the second labelling scheme, compared to the first labelling scheme; or
    adding or removing a label in the first labelling scheme so as to distribute the data points in the labelled dataset more equally between different labels in the second labelling scheme, compared to the first labelling scheme.

7. A method as in claim 1 further comprising:
    obtaining a new dataset in the second radio environment comprising a plurality of values of the first set of features;
    labelling the new dataset using the second labelling scheme;
    determining from the new labelled dataset whether the second labelling scheme is still suitable for use in the second radio environment; and
    responsive to determining that the second labelling scheme is no longer suitable for use in the second radio environment, determining a third labelling scheme for the machine learning model, using the unsupervised labelling method.

8. A method as in claim 1 further comprising:
    determining from the labelled dataset whether the first set of features are suitable for use in the second radio environment; and
    responsive to determining that the first set of features are unsuitable for use in the first radio environment, determining a second set of features for the machine learning model.

9. A method as in claim 8 wherein the step of determining from the labelled dataset whether the first set of features are suitable for use in the second radio environment comprises:
    determining that new features are available in the second radio environment that are different to the first set of features; and/or determining that one or more features in the first set of features are unsuitable for or not available in the second radio environment.

10. A method as in claim 1 wherein the unsupervised labelling method comprises dynamic post-labelling.

11. A method as in claim 1 further comprising:
performing further training on the machine learning model using the dataset, labelled according to the second labelling scheme, as training data.

12. A method as in claim 1 wherein the machine learning model is for use in determining a configuration of a plurality of mobile base stations in order to provide radio access to the communications network in the second radio environment.

13. A method as in claim 12 wherein the mobile base stations comprise drones and wherein the step of obtaining a dataset in the second radio environment comprises:
obtaining information from reference signals sent between the drones and a plurality of User Equipments, UEs, in the second radio environment; and/or
obtaining information related to a geographical layout of a region comprising the second radio environment.

14. A method as in claim 1 wherein the second radio environment comprises a dynamic radio environment.

15. A computer program product comprising a non-transitory computer readable medium, the non-transitory computer readable medium having computer readable code embodied therein, the computer readable code being configured such that, on execution by a suitable computer or processor, the computer or processor is caused to perform the method as claimed in claim 1.

16. A node in communications network for using a machine learning model that has been trained using training data from a first radio environment, in a second radio environment, wherein the machine learning model takes a first set of features as input and outputs a label based on a first labelling scheme, the first labelling scheme having been determined for the first radio environment, the node comprising:
a memory comprising instruction data representing a set of instructions; and
a processor configured to communicate with the memory and to execute the set of instructions, wherein the set of instructions, when executed by the processor, cause the processor to:
obtain a dataset in the second radio environment comprising a plurality of data points comprising values of the first set of features;
label each data point in the dataset using the first labelling scheme;
determine from the labelled dataset whether the first labelling scheme is suitable for use in the second radio environment; and
responsive to determining that the first labelling scheme is unsuitable for use in the second radio environment, determine a second labelling scheme for the machine learning model, using an unsupervised labelling method.

17. A node as in claim 16 wherein the set of instructions, when executed by the processor, further cause the processor to:
perform clustering on the data points in the labelled dataset to determine one or more clusters; and
wherein the step of determining from the labelled dataset whether the first labelling scheme is suitable for use in the second radio environment, is based on the one or more clusters.

* * * * *